United States Patent
Medlar et al.

(10) Patent No.: US 7,661,742 B2
(45) Date of Patent: Feb. 16, 2010

(54) MULTI-FUNCTION CARGO LID/FLOOR

(75) Inventors: Troy Medlar, Marysville, OH (US); Ruben Guanzon, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 11/668,854

(22) Filed: Jan. 30, 2007

(65) Prior Publication Data

US 2008/0179907 A1    Jul. 31, 2008

(51) Int. Cl.
*B60R 5/04* (2006.01)
(52) U.S. Cl. .................. 296/37.16; 296/37.14; 296/37.5
(58) Field of Classification Search .............. 296/37.16, 296/37.14, 37.5, 37.3, 37.8, 37.1; 108/44
See application file for complete search history.

(56) References Cited

U.S. PATENT DOCUMENTS

| 3,393,936 A | 7/1968 | Hall |
| 5,727,836 A | 3/1998 | Hosoya |
| 5,992,331 A | 11/1999 | Inoue et al. |
| 6,050,202 A | 4/2000 | Thompson |
| 6,056,177 A | 5/2000 | Schneider |
| 6,672,640 B2 | 1/2004 | Gehring et al. |
| 6,733,060 B1 * | 5/2004 | Pavkov et al. ............ 296/37.16 |
| 6,942,269 B2 | 9/2005 | Mains |
| 7,059,646 B1 * | 6/2006 | DeLong et al. .......... 296/24.43 |

* cited by examiner

*Primary Examiner*—Joseph D Pape
(74) *Attorney, Agent, or Firm*—Mark E. Duell; Rankin Hill & Clark LLP

(57) ABSTRACT

A multi-functional cargo lid for a vehicle is provided that functions as a floor for a main storage area, a lid for a storage well, and as an elevated shelf. The cargo lid includes a first panel pivotally connected to a cargo lining behind a rear seat of the vehicle and a second panel pivotally connected to the first panel. When the cargo lid is in a first configuration the first and second panels are substantially horizontal and are flush with a floor of the vehicle. When the cargo lid is in a second configuration the first panel is substantially vertical and the second panel is elevated above the floor but remains substantially horizontal. A side latching device that pivots from each rear sidewall of the vehicle is adapted to receive and horizontally secure the second panel thereby securing the cargo lid in the second configuration.

17 Claims, 4 Drawing Sheets

MULTI-FUNCTION CARGO LID/FLOOR

BACKGROUND OF THE INVENTION

1. Field of the Invention

The present invention relates to an automotive vehicle and more specifically to an automotive vehicle with a cargo area having a pivoting multi-function cargo lid.

2. Description of Related Art

Sport utility vehicles, mini vans, and other hatchback type vehicles typically have a rear cargo or storage area that includes a storage well located behind the last row of seats. The inclusion of the storage well permits the operator to store tall items that may not necessarily fit in a storage area without a storage well due to the limited vertical height of the storage area.

One disadvantage, however, is that the storage area is not conducive to compartmentalization. In other words, the size of the storage area cannot be altered to accommodate different sized items. Further, at times it is desired to separate items so as to prevent them from becoming damaged during operation of the vehicle.

Another disadvantage is that the storage area does not provide adequate visual security in the event the operator wishes to store larger valuable items in the rear of the vehicle. In other words, when the operator stores an item in the storage area the item is visible from the outside of the vehicle because there is no means to conceal the item.

Thus, what is needed is a multi-function cargo lid that provides visual security and that is conducive to compartmentalization.

SUMMARY OF THE INVENTION

The present invention solves the above mentioned disadvantage by providing a pivotal multi-functional, multi-configurable cargo lid that serves as a cover for the storage well to provide a secure area, a floor for the storage area, and as a shelf to increase the storage capacity of the storage well and the secure area. Further, the cargo lid can be pivoted to an upright configuration to maximize the storage capacity of the cargo area.

Thus, in accordance with one aspect, the present invention overcomes the above mentioned disadvantages by providing a multi-function cargo lid for a vehicle. The cargo lid has a first panel pivotally connected to a cargo lining behind a rear seat of the vehicle and a second panel pivotally connected to the first panel. When the cargo lid is in a first configuration the first and second panels are in a first substantially horizontal orientation flush with a floor of the vehicle. When the cargo lid is in a second configuration the first panel is in a substantially vertical orientation and the second panel is in a second substantially horizontal orientation, where the second substantial horizontal orientation is elevated above the floor. A side latching device pivotally extends from each rear sidewall of the vehicle. The side latching device receives a side edge of the second panel to secure the second panel in the second substantially horizontal orientation thereby securing the cargo lid in the second configuration.

In accordance with another aspect, the latching device of the present invention has a latch arm pivotally extending from each rear sidewall of the vehicle. When the latch arm is in an operating position, the latch arm is generally parallel with the vehicle floor. The latch arm has a first latch hook and a second latch hook that extend in an upward direction from a top surface of the latch arm. Thus, when the cargo lid is in the second configuration, a downwardly extending lip on a side edge of the second panel is inserted between the first and second latch hooks to secure the second panel in the second substantially horizontal orientation.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
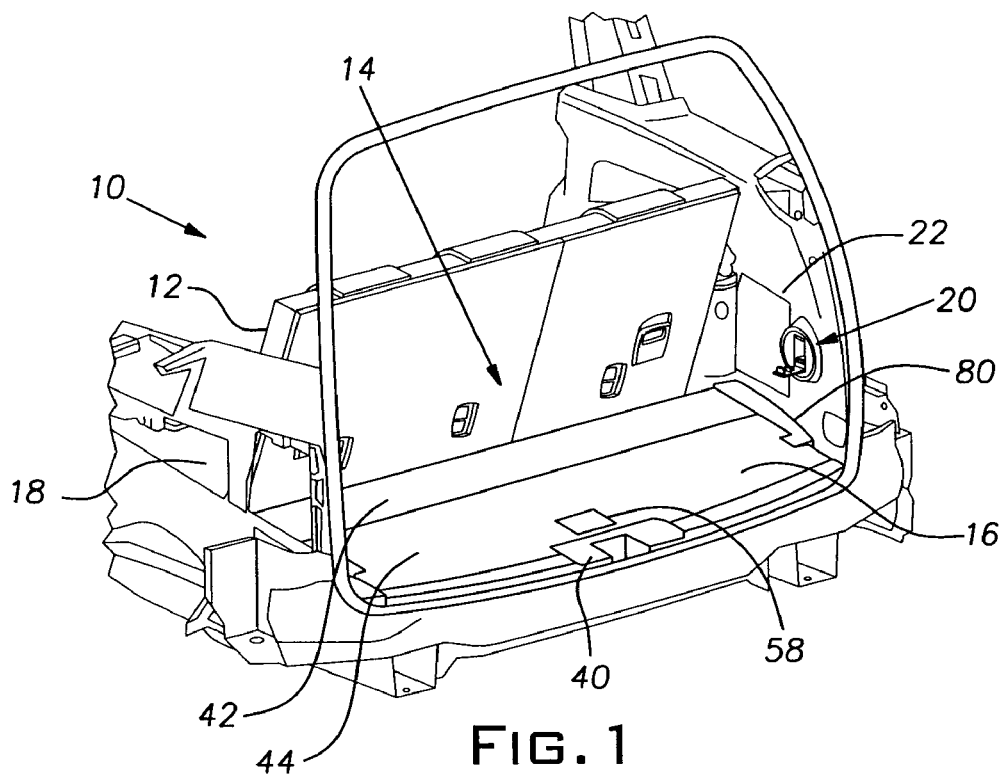
FIG. 1 is a partial perspective view of a rear end of an automotive vehicle showing a cargo lid in a first or floor configuration.

Referring now to the drawings, FIGS. 1-4 show a perspective view of a rear end of a vehicle 10 with a hatch type door (not shown), such as, but not limited to a sport utility vehicle (SUV), a mini van, a crossover vehicle or any other type of hatchback type vehicle. The vehicle 10 includes a rear-bench type seat 12, a cargo area 14 located behind the rear seat 12 and a floor 18. The vehicle 10 further includes a multi-function cargo lid 16 pivotally connected behind the rear seat 12 that functions as a lid, a floor and a shelf. A side latching device 20 is affixed to each sidewall 22 in the rear of the vehicle 10, and is pivotally movable between a vertical orientation for storage and a horizontal or deployed orientation to secure the cargo lid 16 in a shelf configuration as will be described further below.

Still referring to FIGS. 1-4, the cargo area 14 includes a main storage area 24 and a storage well 26. The main storage area 24 is defined as the area behind the rear seat 12 above the cargo lid 16 extending upward toward the roof of the vehicle 10. The main storage area 24 is typically larger than the storage well 26 and is used to store large vertical items that may not fit in the storage well 26 under the cargo lid 16. As mentioned above, items stored in the main storage area 24, however, are not visually hidden from outside the vehicle 10 and, therefore, may be prone to theft.

The storage well 26 is the area below the cargo lid 16, extending in a downward direction below the floor 18 of the vehicle 10. A cargo lining 27, which connects to the floor 18 of the vehicle 10, may be inserted into the storage well 26 to provide protection to the storage well 26. When the cargo lid 16 is configured as shown in FIG. 1, the storage well 26 becomes an enclosed area having four walls 28, a floor 30 and a pivotal lid, where the cargo lid 16 serves as the pivotal lid of the enclosed area. Thus, any items stored in the storage well 26 are visually hidden from outside the vehicle and are, therefore, less prone to theft. The open end of the storage well 26 defines an access opening to permit access to the storage well 26. Surrounding the access opening is a perimeter 34 that includes a front portion 36 and a rear portion 38. A U-shaped latching device 40, located on the rear portion 38 of the perimeter 34, is adapted to cooperate with the cargo lid 16 to secure the cargo lid 16 when configured as shown in FIG. 1. As will be seen further below, the cargo lid 16 can be configured in such a manner that the size of the main storage area 24 and the storage well 26 can be increased or decreased.

Still referring to FIGS. 1-4, the cargo lid 16 has a first panel 42 and a second panel 44. The first panel 42 has a forward edge 46 and a rearward edge 48. The forward edge 46 is pivotally connected to the cargo lining 27 at the front portion 36 of the perimeter 34 of the storage well 26 (see FIG. 3). Any type of mechanical pivoting device known in the art, such as, but not limited to multiple standard hinges, a piano type hinge, flexible straps, Velcro, etc. can be used to mount to first panel 42 to the cargo lining 27. In the embodiment shown in the figures the first panel 42 is connected to the cargo lining 27 with multiple standard-type hinges 49.

The second panel 44 also includes a forward edge 50, a rearward edge 52, and two side edges 54. The forward edge 50 of the second panel 44 is pivotally connected to the rearward edge 48 of the first panel 42. Any type of mechanical pivoting device known in the art, such as, but not limited to multiple standard hinges, a piano type hinge, Velcro, etc. can be used to mount to second panel 44 to the first panel 42. Each side edge 54 defines a U-shaped side notch 56 located toward the rearward edge 52 such that each U-shaped notch 56 is aligned with the side latching device 20 when the cargo lid 16 is moved between configurations. Thus, the latching device 20 passes through the U-shaped notch 56 and does not interfere with the cargo lid 16 when the cargo lid 16 is reconfigured (see FIGS. 4 and 5).

A latching mechanism 58 is positioned approximately halfway between each side edge 54 and near the rearward edge 52 of the second panel 44. Further, the rearward edge 52 defines a U-shaped notch 60 adjacent to the latching mechanism 58. The latching mechanism 58 and U-shaped notch 60 cooperate with the U-shaped latching device 40 on the perimeter 34 of the storage well 26 to align and secure the cargo lid 16 when the cargo lid 16 is configured as shown in FIG. 1.

Figure 5:
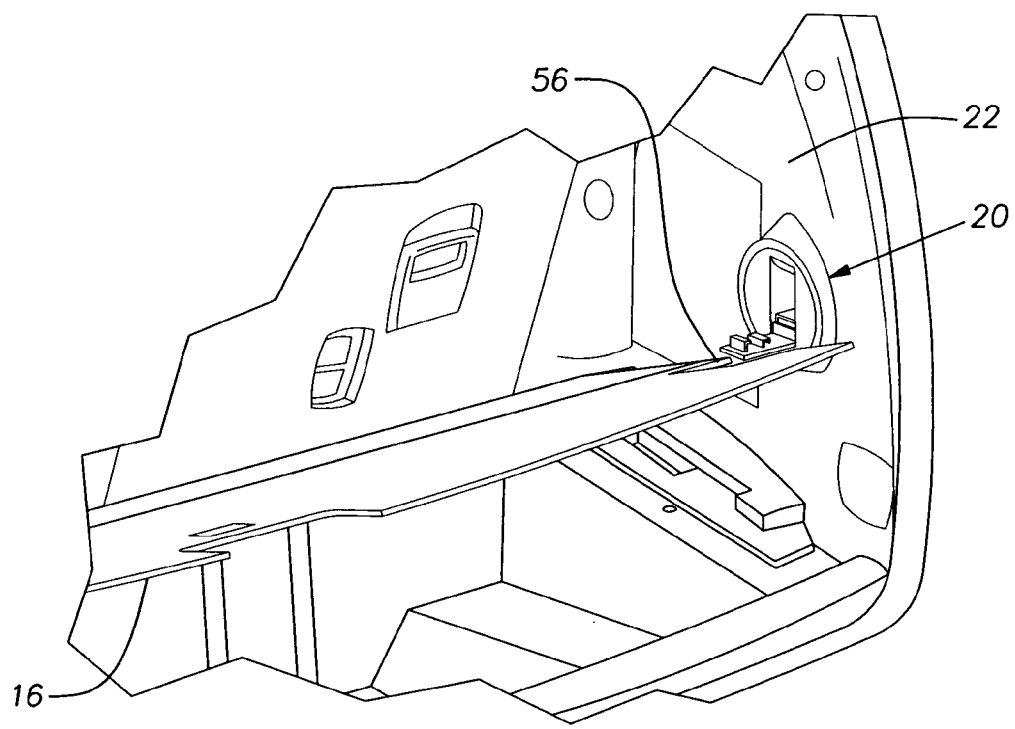
FIG. 5 is a close-up view of FIG. 4.
Figure 6:
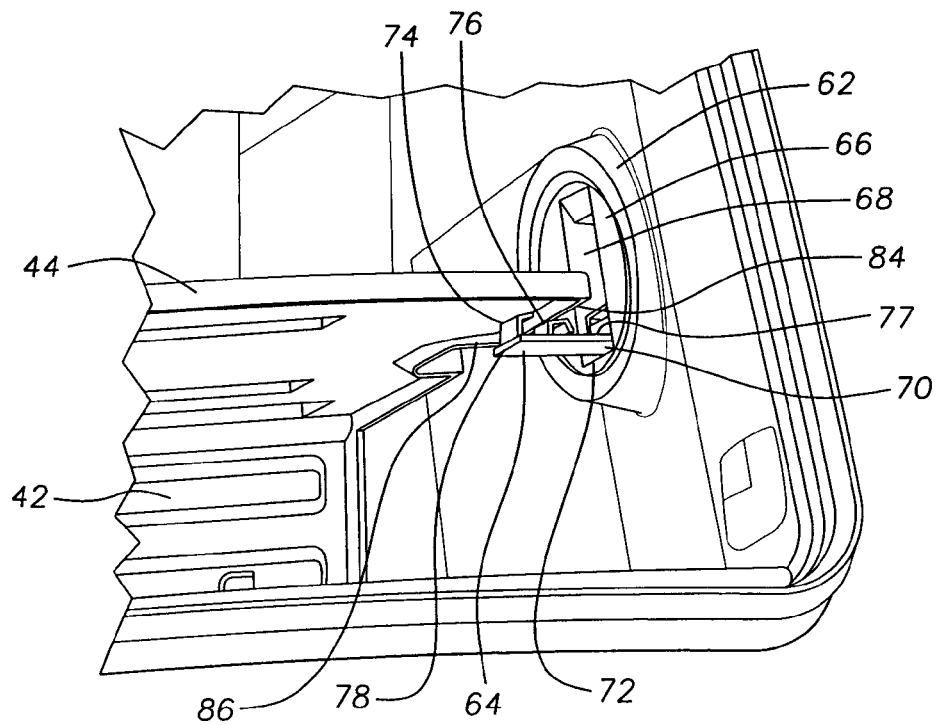
FIG. 6 is a perspective view of a latching device in an operating position.
Figure 7:
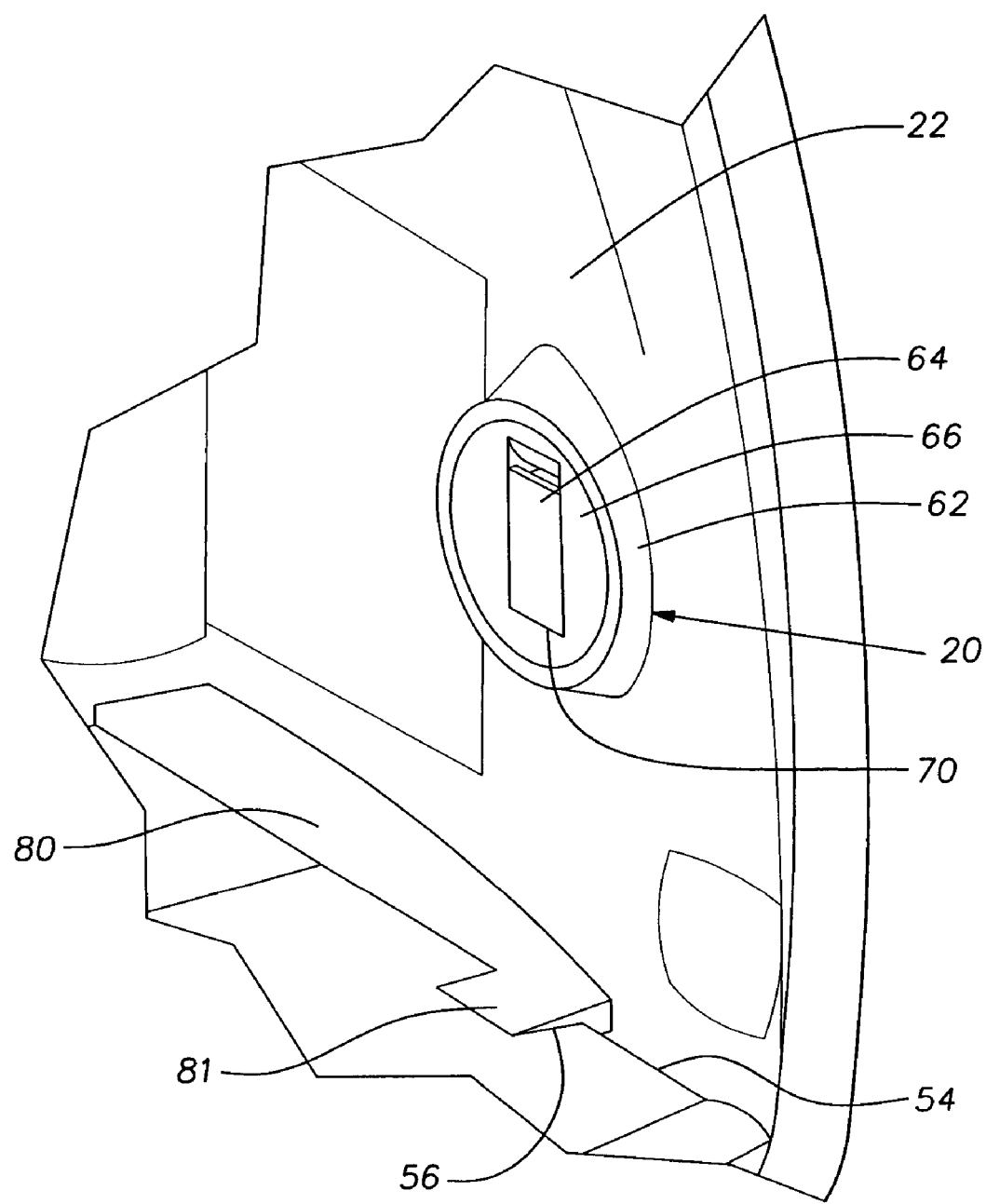
FIG. 7 is a perspective view of the latching device in a stored position.

Referring to FIGS. 5-7, the side latching device 20 includes a hub 62 and a pivotal latch arm 64. A face 66 of the hub 62 defines an opening 68 that is adapted to receive the pivotal latch arm 64. A proximal end 70 of the latch arm 64 is pivotally attached in a bottom portion 72 of the hub opening 68. The latch arm 64, therefore, pivots between an operating position (FIG. 6) and a stored position (FIG. 7).

In the operating position each latch arm 64 extends laterally such that the latch arms 64 are generally parallel to the floor 18 of the vehicle 10. In the stored position, the latch arms 64 extend vertically so as to be generally flush with the face 66 of the hub 62. When in the operating position, a first latch hook 74 and a second latch hook 76 extend in an upward direction from a top surface 77 of the latch arm 64. The first latch hook 74 is located at a distal end 78 of the latch arm 64 and the second latch hook 76 is located between the proximal end 70 and the distal end 78, as best seen in FIG. 6. The latch hooks 74, 76 are adapted to receive the side edge 54 of the second panel 44 when the cargo lid 16 is in the second configuration. More specifically, the downwardly facing surface of the side edge 54 rests upon the upwardly facing surface of the second latch hook 76, and a laterally outwardly facing surface of the first latch hook 74 is disposed adjacent to an inwardly facing surface of the first side edge 54, as shown in FIG. 6.

Referring to FIGS. 1-4 and 6, the multi-function feature of the cargo lid 16 will now be explained. FIG. 1 shows the cargo lid 16 in a first or floor configuration. In the floor configuration, both the first 42 and second 44 panels of the cargo lid 16 are in a substantially horizontal orientation flush with the floor 18 of the vehicle 10 and, thus, are generally parallel with the floor 30 of the storage well 26. The cargo lid 16, thus, serves as a floor for the main storage area 24 and a pivotal lid or cover for the storage well 26.

In the floor configuration, the latching mechanism 58 and U-shaped notch 60 on the second panel 44 cooperate with the U-shaped latching device 40 on the perimeter 34 of the storage well 26 to align and secure the cargo lid 16 in the floor configuration. In addition, the two U-shaped side notches 56 on the second panel 44 cooperate with an L-shaped member 80 situated on a side portion 82 of the perimeter 34. Thus, when the cargo lid is in the floor configuration, a foot portion 81 of the L-shaped member 80 fills the space defined by the U-shaped side notches 56.

Figure 2:
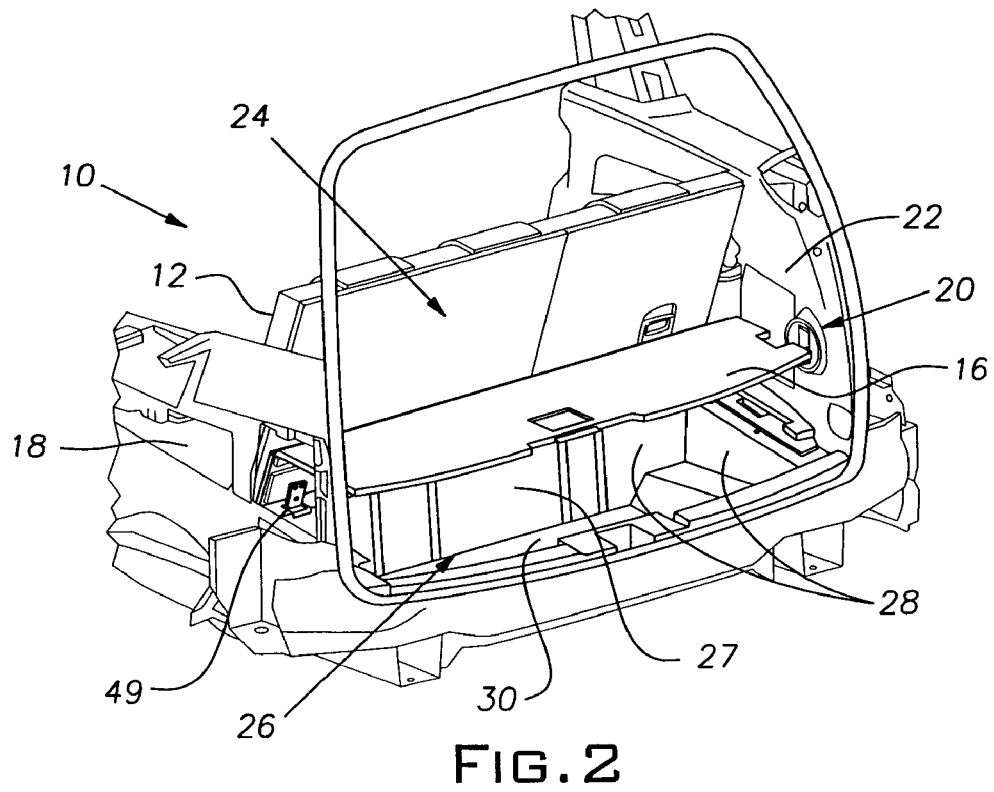
FIG. 2 is a partial perspective view of the rear end of the automotive vehicle showing the cargo lid in a second or shelf configuration.

FIG. 2 shows the cargo lid 16 in a second or shelf configuration. When the cargo lid 16 is reconfigured into the shelf configuration, the first panel 42 pivots at the forward edge 46 with respect to the floor 18 of the vehicle 10 to a substantially vertical orientation and the second panel 44 pivots at the rearward edge 52 with respect to the first panel 42 but remains in a substantially horizontal orientation. The second panel 44, however, is no longer flush with the floor 18 but is elevated above the floor 18. Thus, the first panel 42 is generally parallel to the rear seat 12 and the second panel 44 remains generally parallel to the floor 30 of the storage well 26.

Referring to FIG. 6, to secure the cargo lid 16 in the shelf configuration, a downwardly facing lip 84 on each side edge 54 of the second panel 44 is received by the first latch hook 74 and the second latch hook 76. The lip 84 rests on the second latch hook 76, and is laterally engaged by the first latch hook 74. The first latch hook 74 is rearwardly adjacent the side edge lip 86 at the U-shaped notch and engages the lip 86 to prevent rearward movement of the second panel 44. Thus, the first latch hook 74 and second latch hook 76 vertically support the second panel 44 and prevent the second panel 44 from shifting either forward and backward or side to side, thereby stabilizing the cargo lid 16 during operation of the vehicle 10.

Consequently, because the cargo lid 16 is now elevated and in the shelf configuration, the storage capacity of the cargo area 14 is optimized. Thus, larger items can be stored both under the cargo lid 14 in the storage well 26 and on the cargo lid 14 in the main storage area 24.

Figure 3:
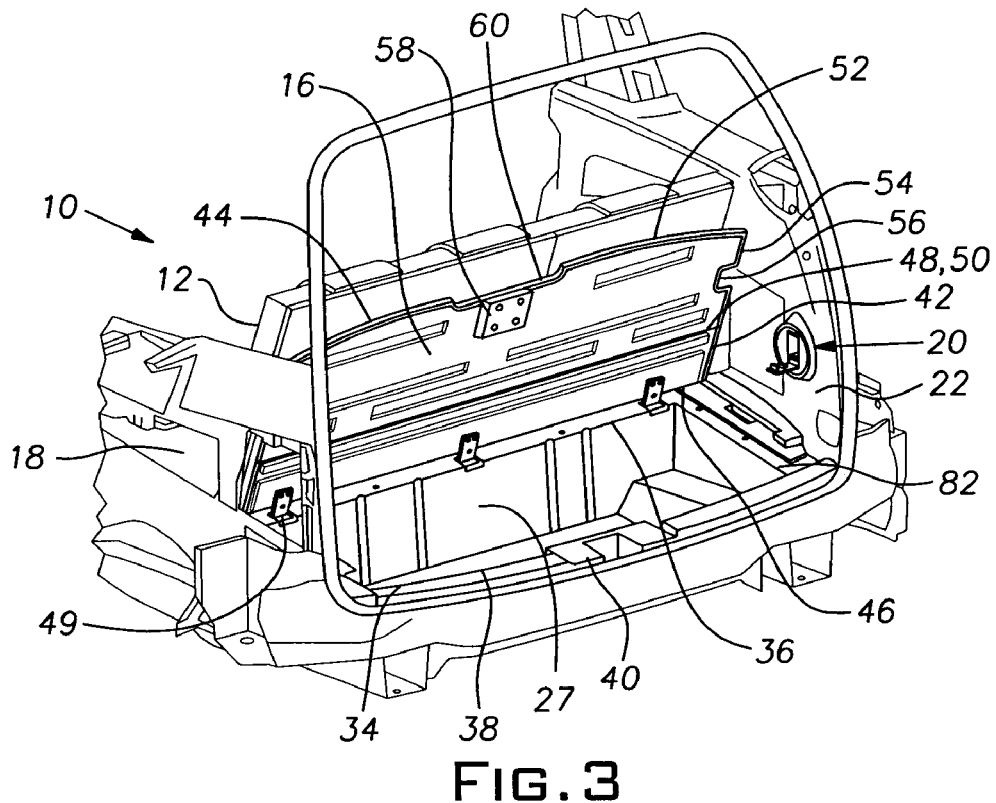
FIG. 3 is a partial perspective view of the rear end of the automotive vehicle showing the cargo lid in a third or upright configuration.
Figure 4:
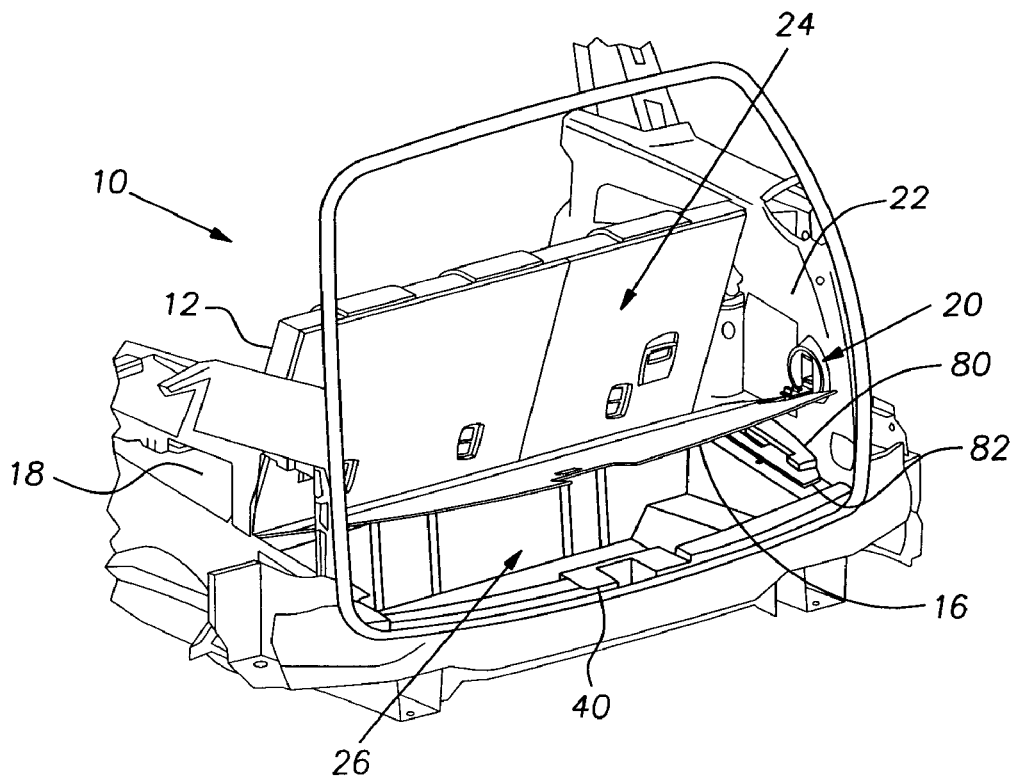
FIG. 4 is a partial perspective view of a rear end of an automotive vehicle showing the cargo lid movable between the first, second and third configurations.

FIG. 3 shows the cargo lid 16 in a third or upright configuration. In the upright configuration, both the first 42 and second 44 panels pivot with respect to the floor 18 of the vehicle 10 in an upward direction and are generally parallel with the rear seat 12. Thus, the main storage area 24 and the storage well 26 are combined into a single storage area allowing for the storage of large items. The cargo lid 16 can be secured in the upright configuration to the back of the rear seat 12 by any securing means (not shown) commonly known in the art, such as, but not limited to hooks, latches, straps, snaps, Velcro, etc.

While specific embodiments of the invention have been described and illustrated, it is to be understood that these embodiments are provided by way of example only and that the invention is not to be construed as being limited but only by proper scope of the following claims.

What is claimed is:

1. A cargo lid for a vehicle comprising:
   a first panel pivotally connected to a cargo lining behind a rear seat of the vehicle; and
   a second panel pivotally connected to the first panel,
   wherein, when the cargo lid is in a first configuration, the first and second panels are in a first substantially horizontal orientation flush with a floor of the vehicle,
   wherein, when the cargo lid is in a second configuration, the first panel is in a substantially vertical orientation and the second panel is in a second substantially horizontal orientation, where the second substantial horizontal orientation is elevated above the floor, and
   wherein a side latching device pivotally extending from each rear sidewall of the vehicle is adapted to receive a side edge of the second panel to secure the second panel in the second substantially horizontal orientation, thereby securing the cargo lid in the second configuration.

2. The cargo lid of claim 1, wherein when the cargo lid is in a third configuration, the first and second panels are in a substantially vertical orientation and are generally parallel to the rear seat.

3. The cargo lid of claim 1, wherein the first panel comprises a forward edge and a rearward edge, the second panel comprises a forward edge, a rearward edge, and two side edges, the forward edge of the first panel is pivotally connected to the cargo lining, the forward edge of the second panel is pivotally connected to the rearward edge of the first panel, and each side edge of the second panel defines a side notch in a manner such that the side notch aligns with the side latching device when the cargo lid is moved between the first configuration and the second configuration to facilitate reconfiguration of the cargo lid.

4. A cargo lid in combination with a side latching device for a vehicle comprising:
   a first panel pivotally connected to a vehicle floor behind a rear seat of the vehicle; and
   a second panel pivotally connected to the first panel, the second panel including two side edges, each side edge having a downwardly extending lip;
   the side latching device comprising a latch arm pivotally attached to a sidewall of the vehicle and movable from a stored position to an operating position such that the latch arm is generally parallel with the floor of the vehicle when in the operating position, the latch arm having a first and a second latch hook extending in an upward direction from a top surface of the latch arm,
   wherein, when the cargo lid is in a first configuration, the first and second panels are in a first substantially horizontal orientation flush with the floor,
   wherein, when the cargo lid is in a second configuration, the first panel is in a substantially vertical orientation and the second panel is elevated above the floor in a second substantially horizontal orientation, and
   wherein, when the cargo lid is in the second configuration, the latch arm is in the operating position and the lip is received by the first and second latch hooks to secure the second panel in the second substantially horizontal orientation thereby securing the cargo lid in the second configuration.

5. The combination of claim 4, wherein, when the cargo lid is in a third configuration, the first and second panels are in a substantially vertical orientation and are generally parallel to the rear seat.

6. The combination of claim 4, wherein the side latching device further includes a hub, the hub having a face that defines an opening adapted to receive the latch arm when the latch arm is in the stored position, a proximal end of the latch arm is pivotally attached to a bottom of the hub opening, and the first latch hook is located at a distal end of the latch arm and the second latch hook is located between the proximal end and the distal end.

7. The combination of claim 4, wherein the first panel comprises a forward edge and a rearward edge, the second panel comprises a forward edge, a rearward edge, and two side edges, the forward edge of the first panel is pivotally connected to a cargo lining, the forward edge of the second panel is pivotally connected to the rearward edge of the first panel, and each side edge of the second panel defines a side notch such that the side notch aligns with the side latching device when the cargo lid is moved between the first configuration and second configuration to facilitate reconfiguration of the cargo lid.

8. A vehicle comprising:
   a multi-configurable cargo lid pivotally attached to a vehicle floor behind a rear seat of the vehicle, the cargo lid having a first panel and a second panel;
   a cargo area behind the rear seat of the vehicle, the cargo area comprising a main storage area defined above the cargo lid and between each rear side wall of the vehicle and a storage well defined below the cargo lid and between each rear side wall of the vehicle;
   a side latching device including a latch arm vertically extending from each rear side wall of the vehicle, the latch arm being movable between a stored position and an operating position, wherein when in the operating position, the latch arms extend toward one another;
   wherein when the cargo lid is in a first configuration the first and second panels are in a first substantially horizontal orientation flush with the floor,
   wherein when the cargo lid is in a second configuration the first panel is in a substantially vertical orientation and the second panel is elevated above the floor in a second substantially horizontal orientation, and
   wherein when the cargo lid is in the second configuration, the latch arms are in the operating position and are adapted to receive the second panel to secure the second panel in the second substantially horizontal orientation thereby securing the cargo lid in the second configuration.

9. The vehicle of claim 8, wherein when the cargo lid is in a third configuration, the first and second panels are in the substantially vertical orientation and are generally parallel to the rear seat.

10. The vehicle of claim 8, wherein the side latching device further includes a hub, the hub having a face that defines an opening adapted to receive the latch arm when the latch arm is in the stored position, the latch arm includes a first latch hook and a second latch hook extending in an upward direction from a top surface of the latch arm, the first latch hook is located at a distal end of the latch arm and the second latch hook is located between a proximal end and the distal end of the latch arm, and the proximal end of the latch arm is pivotally attached to a bottom of the hub opening.

11. The vehicle of claim 10, wherein the first panel comprises a forward edge and a rearward edge, the second panel comprises a forward edge, a rearward edge, and two side edges, the forward edge of the first panel is pivotally connected to a cargo lining, the forward edge of the second panel is pivotally connected to the rearward edge of the first panel, each side edge of the second panel defines a side notch such that the side notch aligns with the side latching device when the cargo lid is moved between the first configuration and the second configuration facilitating reconfiguration of the cargo lid.

12. The vehicle of claim 11, wherein the storage well defines an access opening having a perimeter, the perimeter comprising a front portion, a rear portion, a lid latching device located on the rear portion of the perimeter, wherein a latching mechanism is located near the rearward edge of the second panel, wherein the rearward edge of the second panel defines a notch, and wherein the latching mechanism on the second panel and the notch cooperate with the lid latching device on the perimeter to thereby secure the cargo lid in the first configuration.

13. The vehicle of claim 12, wherein the perimeter further includes two side edges, a protruding portion located on each side edge of the perimeter, and each side notch cooperates with the protruding portion in a manner such that when the cargo lid is in the floor configuration the side notch is aligned with the protruding portion.

14. A method for reconfiguring a cargo lid having a first panel and a second panel for a vehicle from a first configuration to a second configuration, the first configuration being defined as a floor configuration and the second configuration being defined as a shelf configuration, comprising the steps of:

moving a pair of latch arms from a stored position to an operating position;

pivoting the cargo lid upwardly past the latch arms;

pivoting the second panel downwardly relative to the first panel; and resting the second panel on the latch arms.

15. The method of claim 14, wherein the latch arms include a first latch hook at a distal end of the latch arm and a second latch hook between a proximal end and the distal end of the latch arm, and a side edge of the second panel includes a downwardly extending lip, the method further comprising the step of:

engaging the lip with the first latch hook and the second latch hook to secure the cargo lid in the second configuration.

16. The method of claim 15, wherein when the cargo lid is in the first configuration the first and second panels are in a first substantially horizontal orientation flush with a floor of the vehicle and when the cargo lid is in the second configuration the first panel is in a substantially vertical orientation and the second panel is in a second substantially horizontal orientation, where the second substantial horizontal orientation is elevated above the floor.

17. The method of claim 16, wherein a side latching device is affixed to each sidewall of the vehicle and includes a hub, the hub having a face that defines an opening adapted to receive the latch arms when the latch arms are in the stored position.

\* \* \* \* \*